United States Patent
Burdick

(10) Patent No.: US 11,274,789 B2
(45) Date of Patent: Mar. 15, 2022

(54) MOUNTING BRACKET FOR A CAMERA

(71) Applicant: Kelly Burdick, Tillamook, OR (US)

(72) Inventor: Kelly Burdick, Tillamook, OR (US)

( * ) Notice: Subject to any disclaimer, the term of this patent is extended or adjusted under 35 U.S.C. 154(b) by 182 days.

(21) Appl. No.: 16/527,812

(22) Filed: Jul. 31, 2019

(65) Prior Publication Data
US 2020/0041066 A1 Feb. 6, 2020

Related U.S. Application Data

(60) Provisional application No. 62/712,512, filed on Jul. 31, 2018.

(51) Int. Cl.
*F16M 13/00* (2006.01)
*F16M 13/02* (2006.01)
*G03B 17/00* (2021.01)

(52) U.S. Cl.
CPC ............. *F16M 13/02* (2013.01); *G03B 17/00* (2013.01)

(58) Field of Classification Search
CPC ................................ F16M 11/06; F16M 11/10
USPC ...................... 248/230.1, 230.4, 230.5, 218.4
See application file for complete search history.

(56) References Cited

U.S. PATENT DOCUMENTS

| | | | |
|---|---|---|---|
| 7,534,056 B2 | 5/2009 | Cross et al. | |
| 7,832,696 B2 | 11/2010 | Goodman | |
| 7,926,771 B2 * | 4/2011 | DeMartine | F16M 13/022 248/218.4 |
| 8,974,128 B2 | 3/2015 | Cuddeback | |
| 9,115,740 B2 * | 8/2015 | Chang | F16B 2/12 |
| 9,126,723 B2 | 9/2015 | Messerschmidt | |
| 9,332,748 B2 * | 5/2016 | Brown | A62B 35/0037 |
| D838,388 S * | 1/2019 | Parker | D25/68 |
| 2009/0242328 A1 * | 10/2009 | Cabrera | E06C 7/06 182/111 |
| 2010/0018803 A1 * | 1/2010 | Schwenke | E06C 1/34 182/206 |
| 2010/0213009 A1 * | 8/2010 | Guinovart | E06C 7/482 182/206 |
| 2011/0266409 A1 * | 11/2011 | Warrick | A61J 1/16 248/316.5 |
| 2015/0257776 A1 * | 9/2015 | Sauer | A61B 17/2804 606/207 |
| 2017/0075197 A1 | 3/2017 | DeMers et al. | |

* cited by examiner

*Primary Examiner* — Steven M Marsh
(74) *Attorney, Agent, or Firm* — Boudwin Intellectual Property; Daniel Boudwin

(57) ABSTRACT

A mounting bracket for a camera. The mounting bracket for a camera includes a bracket. The bracket has a first end extends in an opposite direction of a second end. The first end includes a first arm and a second arm extending therefrom. The first arm and the second arm are mounted on an upper surface of the bracket in a way that permits rotation. The second arm is rotatably mounted on the upper surface of the bracket, on an opposing edge thereof, from the first arm. The first arm and the second arm are threadably engaged with each other, such that the area between the first arm and the second arm is expandable and retractable via an adjuster.

6 Claims, 2 Drawing Sheets

MOUNTING BRACKET FOR A CAMERA

CROSS REFERENCE TO RELATED APPLICATIONS

This application claims the benefit of U.S. Provisional Application No. 62/712,512 filed on Jul. 31, 2018. The above identified patent application is herein incorporated by reference in its entirety to provide continuity of disclosure.

BACKGROUND OF THE INVENTION

The present invention relates to a mounting bracket for a camera. Specifically, the present invention provides a bracket with a pair of arms extending therefrom that are designed to support the bracket upon a tree.

Outdoor game cameras and outdoor security cameras are commonly installed to record the activity of a targeted area at specific times. For example, a homeowner may install an outdoor security camera on a porch to record any activity near the door of the home to prevent break-ins or other crimes from occurring near the home. Additionally, outdoor game cameras are commonly utilized to monitor the wildlife activity of a desired area, such as by hunters or other wildlife enthusiasts.

The use of these items, however, involves careful installation to ensure that an ideal view is captured by the outdoor cameras. If a camera is installed at too low of an elevation, an individual or an animal may attempt to remove the camera from the installed upon surface. In the case of home security cameras, this can be especially concerning as an individual who removes a home security camera would be able to vandalize the home at his or her convenience. Additionally, outdoor game cameras are unable to fulfill their desired purpose if the angle at which they capture images is significantly altered. By installing outdoor cameras at a higher altitude, the individual is able to ensure that the camera will not be tampered with by an individual or wildlife.

However, an inconvenience created by the vertical elevation is that the camera must be oriented downward in order to properly capture a desired area. Otherwise, the camera would point at a straight angle above a desired activity, while individuals and animals would be able to pass underneath the camera without being photographed. Thus, there is a need in the known art for a device that provides convenience to a user by allowing for an outdoor camera to be secured to a vertical support surface, such as a tree, while also allowing for the device to be movably orientable.

SUMMARY OF THE INVENTION

In view of the foregoing disadvantages inherent in the known types of camera-mounting bracket devices now present in the prior art, the present invention provides a mounting bracket for a camera wherein the same can be utilized for providing convenience for the user when orienting an outdoor camera into a desired position.

The present system comprises a bracket. The bracket defines a first end that is disposed oppositely a second end. The first end includes a first arm and a second arm extending therefrom. The first arm and the second arm are each rotatably mounted on an upper surface of the bracket. The second arm is rotatably mounted on the upper surface of the bracket, on an opposing edge thereof, from the first arm. The first arm and the second arm are threadably engaged with each other, such that the area between the first arm and the second arm is expandable and retractable via an adjuster. A camera is placed on the bracket and secured thereto.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
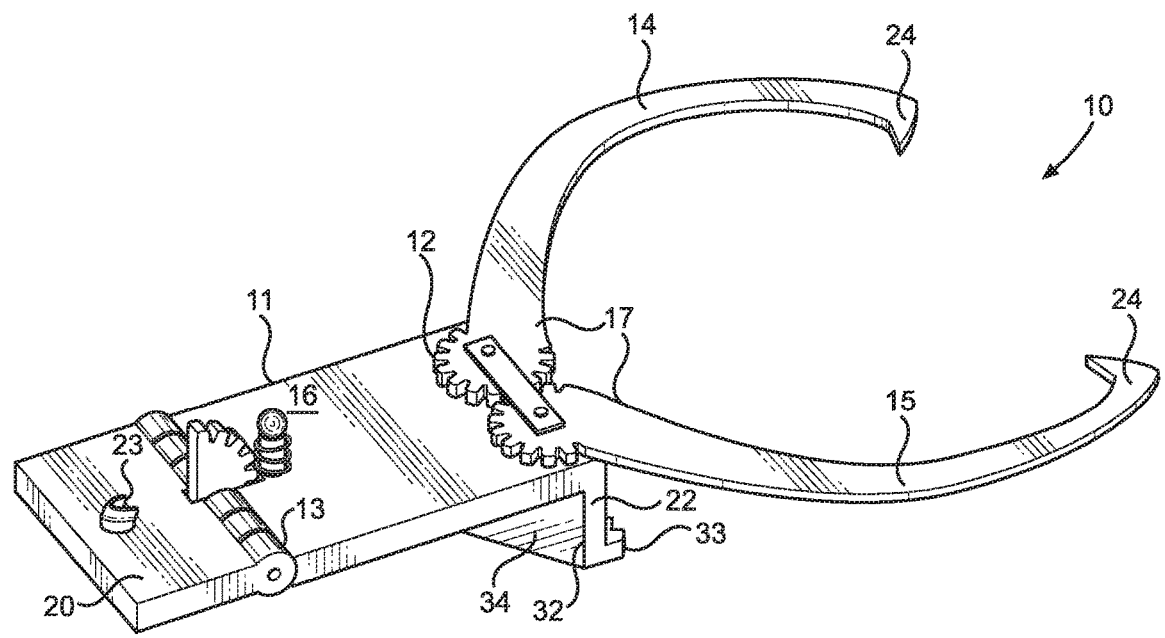
FIG. 1 shows a perspective view of an upper surface of an embodiment of the mounting bracket for a camera.

Reference is made herein to the attached drawings. Like reference numerals are used throughout the drawings to depict like or similar elements of the mounting bracket for a camera. The figures are intended for representative purposes only and should not be considered to be limiting in any respect.

Referring now to FIG. 1, there is shown a perspective view of an upper surface of an embodiment of the mounting bracket for a camera. The mounting bracket for a camera 10 comprises a bracket 11. The bracket 11 defines a first end 12 disposed oppositely of a second end 13. The bracket 11 is rigid, and is made of any suitably durable material, such as a metal material or a plastic material. In the illustrated embodiment, the bracket 11 is rectangular, such that an extended surface is provided on which a camera can be disposed away from an object to which the mounting bracket for a camera is attached. In other embodiments, the bracket 11 is of any suitable size, shape or dimension for a contemplated use.

Figure 2:
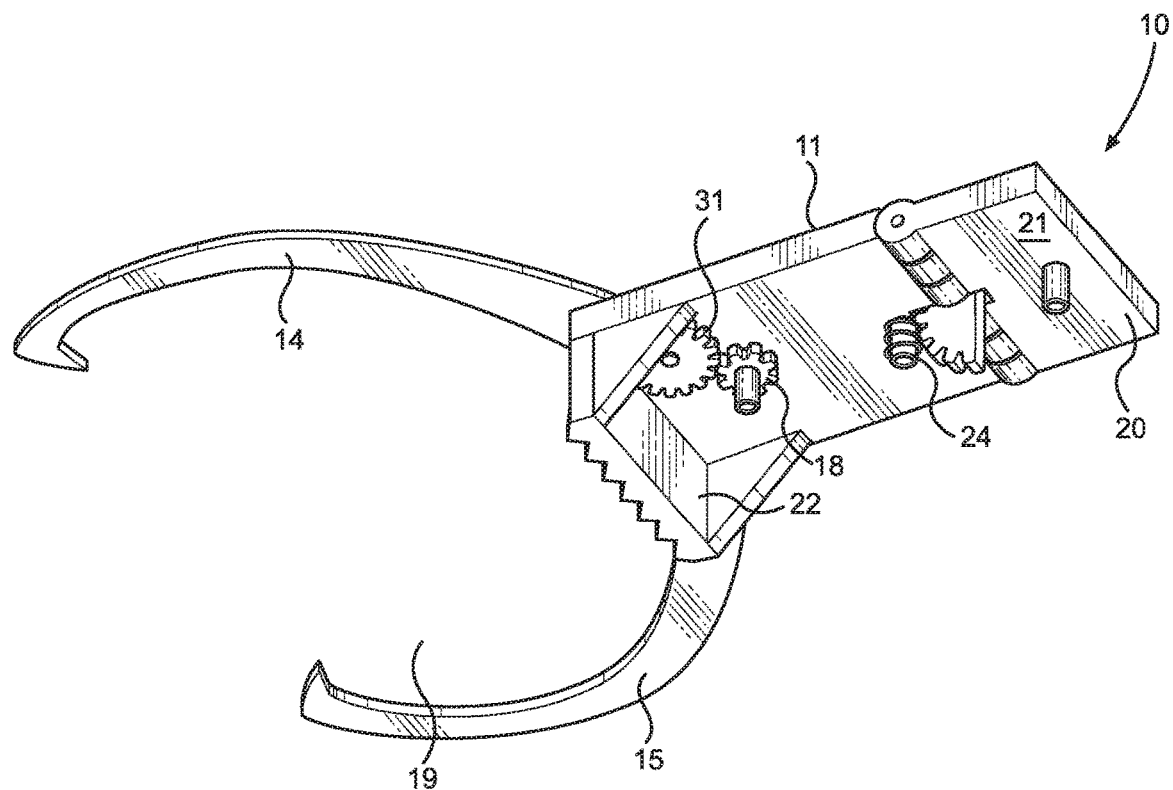
FIG. 2 shows a perspective view of a lower surface of an embodiment of the mounting bracket for a camera.

A first arm 14 and a second arm 15 are disposed on the first end 12 of the bracket 11. As illustrated, the first arm 14 is rotatably mounted on an upper surface 16 of the bracket 11. Furthermore, the second arm 15 is rotatably mounted on the upper surface 16 of the bracket, on an opposing side of the bracket 11 as the first arm 14. The first arm 14 and the second arm 15 are threadably engaged with each other at a base end 17 each thereof. As such, simultaneous adjustment of each arm is enabled. Furthermore, the first arm 14 and the second arm 15 are in operable connection with an adjuster (as shown in FIG. 2, 18), such that engagement of the adjuster enlarges and constricts an area (as shown in FIG. 2, 19) between the first arm 14 and the second arm 15. In the illustrated embodiment, the first arm 14 and the second arm 15 are arcuate in shape, such that the bracket 11 can be more stably secured to a rounded object, such as a tree or a post. In alternate embodiments, the first arm 14 and the second arm 15 are of any suitable shape for mounting to a specific object.

The bracket 11 is configured to removably received a camera thereon. In the illustrated embodiment, a receiver 23 is disposed on the second end 13 of the bracket 11, such that a camera can be removably affixed to the bracket 11 opposite of the object to which the mounting bracket for a camera is attached. In the illustrated embodiment, the receiver 23 is a threaded rod configured to correlate to a mounting socket of a camera or other recording device. In alternate embodiments, the receiver 23 is of any suitable configuration for securing a camera or recording device to the bracket 11, such as a plate receiver, a friction-inducing pad, or a similar mechanism.

In the illustrated embodiment, the mounting bracket for a camera 10 further comprises an extension platform 20 hingedly affixed to the second end 13 of the bracket 11. In the illustrated embodiment, the extension platform 20 is of the same width as the bracket 11, such that there are no exposed corners created by either the extension platform 20 or the bracket 11. Due to the hinged affixation of the extension platform 20 to the bracket 11, the extension platform 20 is vertically rotatable around an axis defined by a pivot point at the hinge. Additionally, in the illustrated embodiment, the receiver 23 is disposed on the extension platform 20. As such, when a camera is mounted on the receiver 23, the angle at which the camera is pointed can be adjusted by rotation of the extension platform 20 around the axis.

Furthermore, in the illustrated embodiment, the mounting bracket for a camera 10 further comprises a support brace 22 extending from the first end 12 of the bracket 11. In the illustrated embodiment, the support brace 22 defines a perpendicularly extending segment 32. Furthermore, a plurality of tines 33 are shown on the perpendicularly extending segment 32, such that the plurality of tines 33 can more effectively engage a soft or pierceable surface, such as a tree or a wooden post. In the illustrated embodiment, the orientation of the plurality of tines 33 is parallel to the bracket 11. Additionally, the support brace 22 may further comprise an angular brace 34, such that the weight of an object, such as a camera, mounted to the bracket 11 is more evenly dispersed upon the support brace 22.

Additionally, as shown in the illustrated embodiment, the first arm 14 and the second arm 15 each comprises a tooth 24 disposed on a distal end each thereof. In the illustrated embodiment, each tooth 24 is triangular and defines a point, such that the tooth can pierce a soft surface, such as a tree or a wooden post. Additionally, in the illustrated embodiment, each tooth 24 is oriented inward, such that each tooth 24 will make contact with the object upon which the mounting bracket for a camera 10 is attached.

Referring now to FIG. 2, there is shown a perspective view of a lower surface of an embodiment of the mounting bracket for a camera. In the illustrated embodiment, the adjuster 18 is accessible on a bottom surface 21 of the bracket 11. As such, the adjuster 18 is accessible from an area below the mounting bracket for a camera 10 allowing an individual to access the adjuster 18 while the mounting bracket for a camera 10 is installed upon an object, such as a tree.

In the illustrated embodiment, the adjuster 18 is an adjuster gear with a bolt extending downward therefrom. As such, the bolt can be engaged via a tool, such as a screwdriver. Once the bolt is engaged and the adjuster gear is rotated, an intermediate gear 31 is rotated. When the intermediate gear 31 is rotated, the interface of the first arm 14 and the second arm 15 is engaged, and the area 19 between the first arm 14 and the second arm 15 is enlarged (when engaged in a first direction) and constricted (when engaged in a second direction).

Figure 3:
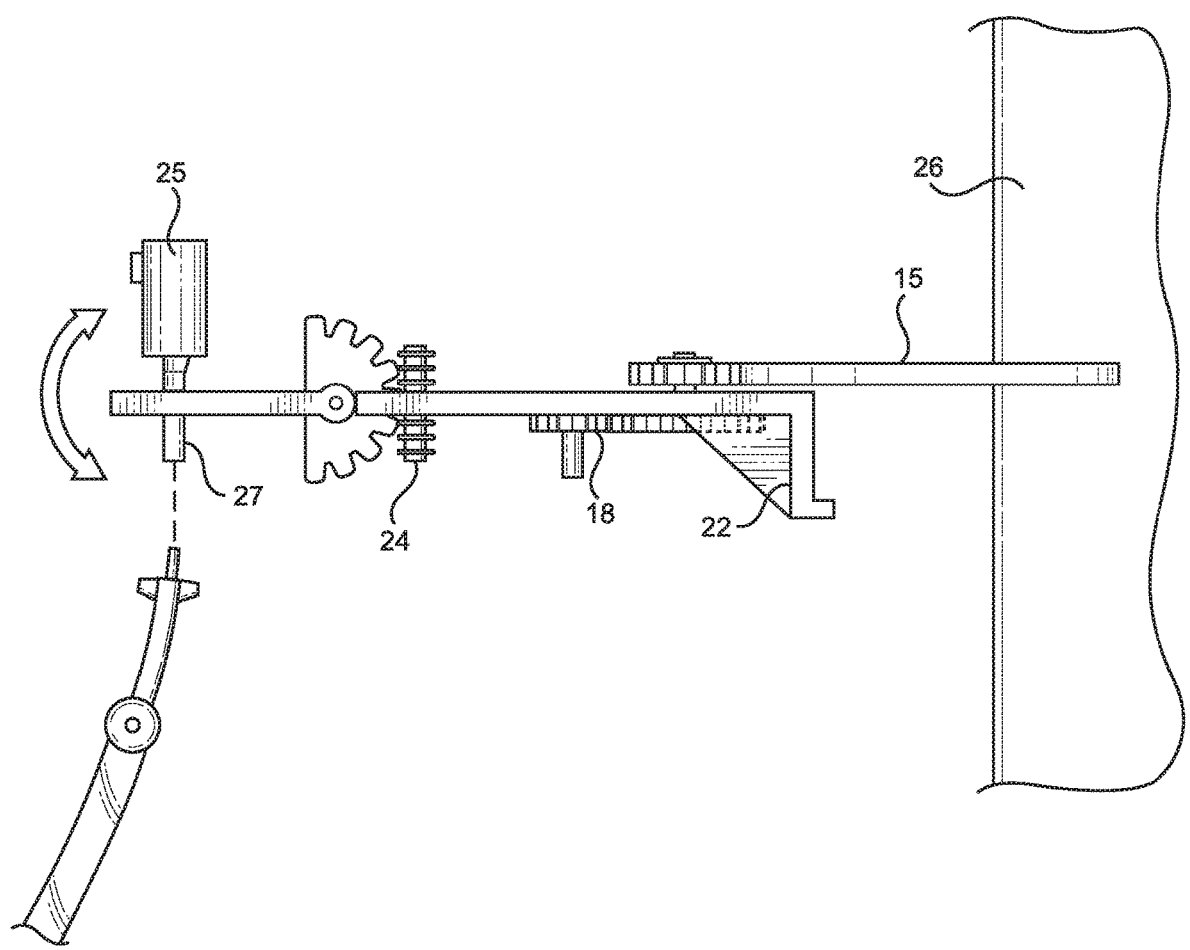
FIG. 3 shows a side view of an embodiment of the mounting bracket for a camera, mounted upon a tree.

Additionally, in the illustrated embodiment, the extension platform 20 further comprises an extension platform adjuster 24, such that the angle of the extension platform can be adjusted by the user. In the illustrated embodiment, the extension platform adjuster 24 is defined by a threaded rod in operable connection with an extension platform gear. As such, the user can engage the threaded rod, which in turn engages the extension platform gear and causes angular manipulation of the extension platform 20 around the pivot point (as shown in FIG. 3). As such, the angle of a camera, or other recording device, can be manipulated thereby.

Referring now to FIG. 3, there is shown a side view of an embodiment of the mounting bracket for a camera, mounted upon a tree. In use, the mounting bracket for a camera is secured to an object, such as a tree 26, through engagement of the first arm and the second arm 15. In a fully installed position, the support brace 22 rests flush with the tree 26, such that pressure on the support brace 22 is absorbed by the tree 26. As shown, a camera 25 can be affixed to the receiver. In the illustrated embodiment, the receiver is in operable connection with a receiver adjuster 27. The receiver adjuster 27 is configured to adjust the receiver, such that a camera can be securely received by the extension platform 20.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A mounting bracket for a camera, comprising:
a bracket defining a first end opposite of a second end;
a first arm and a second arm disposed on the first end of the bracket;
the first arm rotatably mounted on an upper surface of the bracket;
the second arm rotatably mounted on the upper surface of the bracket, on an opposite side of the bracket from the first arm;
the first arm and the second arm being engaged with each other at a base end each thereof;
the first arm and the second arm in operable connection with an adjuster;
the adjuster configured to enlarge and constrict the area between the first arm and the second arm;
the bracket configured to receive a camera;
an extension platform hingedly affixed to the second end of the bracket.

2. The mounting bracket for a camera of claim 1, wherein the adjuster is disposed on a bottom surface of the bracket.

3. The mounting bracket for a camera of claim 1, further comprising a support brace extending from the first end of the bracket.

4. The mounting bracket for a camera of claim 1, wherein the bracket further comprises a receiver for a camera.

5. The mounting bracket for a camera of claim 1, wherein the first arm and the second arm each further comprises a tooth disposed on a distal end thereof.

6. A mounting bracket for a camera, comprising:
a bracket defining a first end opposite of a second end;
a first arm and a second arm disposed on the first end of the bracket;
the first arm rotatably mounted on an upper surface of the bracket;
the second arm rotatably mounted on the upper surface of the bracket, on an opposite side of the bracket from the first arm;
the first arm and the second arm being engaged with each other at a base end each thereof;
the first arm and the second arm in operable connection with an adjuster;
the adjuster configured to enlarge and constrict the area between the first arm and the second arm;
the bracket configured to receive a camera via a receiver;
an extension platform hingedly affixed to the second end of the bracket;
a support brace extending from the first end of the bracket.

* * * * *